(12) United States Patent
Kitchin et al.

(10) Patent No.: US 7,054,229 B2
(45) Date of Patent: May 30, 2006

(54) MULTI-LINE TOWED ACOUSTIC ARRAY SHAPE MEASUREMENT UNIT

(75) Inventors: David A. Kitchin, Laurel, MD (US); Walter S. Allensworth, Poolesville, MD (US)

(73) Assignee: The Johns Hopkins University, Baltimore, MD (US)

( * ) Notice: Subject to any disclaimer, the term of this patent is extended or adjusted under 35 U.S.C. 154(b) by 344 days.

(21) Appl. No.: 10/425,580

(22) Filed: Apr. 29, 2003

(65) Prior Publication Data
US 2005/0058022 A1 Mar. 17, 2005

Related U.S. Application Data

(60) Provisional application No. 60/376,681, filed on Apr. 30, 2002.

(51) Int. Cl.
*G01S 3/80* (2006.01)
(52) U.S. Cl. .................................................... 367/130
(58) Field of Classification Search ................ 367/101, 367/127, 13, 106, 130
See application file for complete search history.

(56) References Cited

U.S. PATENT DOCUMENTS

| | | | |
|---|---|---|---|
| 3,614,719 A | 10/1971 | Treacy | 367/95 |
| 3,676,565 A | 7/1972 | Rowe | 434/6 |
| 4,173,748 A | 11/1979 | Lewandowski | 367/123 |
| 4,271,707 A | 6/1981 | Lakin | 73/614 |
| 4,603,408 A | 7/1986 | Singhal et al. | 367/92 |
| 4,895,441 A | 1/1990 | Allen, Jr. | 367/101 |
| 5,031,159 A * | 7/1991 | Rouquette | 367/130 |
| 5,079,751 A | 1/1992 | Woodward | 367/96 |
| 5,260,910 A | 11/1993 | Panton | 367/100 |
| 5,359,575 A * | 10/1994 | Williams et al. | 367/127 |
| 5,535,176 A | 7/1996 | Yang | 367/13 |
| 5,745,437 A | 4/1998 | Wachter et al. | 367/100 |
| 5,889,490 A | 3/1999 | Wachter et al. | 367/100 |

OTHER PUBLICATIONS

The Emergence of Low-Frequency Active Acoustics as a Critical Antisubmarine War Fare Technology, JHUAPL Techok. vol. 13 No.1 (1992) G. D. Tyler, Jr.

* cited by examiner

*Primary Examiner*—Daniel Pihulic
(74) *Attorney, Agent, or Firm*—Albert J. Fasulo, II

(57) ABSTRACT

An acoustic array comprising a plurality of nodes attached to two or more lines. Some or all of the nodes include an emitting transducer and a receiving hydrophone, and the balance include only a receiving hydrophone. Each emitting transducer has associated electronics comprising a high fidelity amplifier and a stored waveform input to the operational amplifier to drive the amplifier, the output of the amplifier exciting the transducer to emit a chirp having a hyperbolic frequency modulated (HFM) waveform. The frequency spectrum of the HFM chirp lies well below the resonant frequency of the transducer. The chirp emitted by a transducer in the node is received and processed by hydrophones in other nodes with a high fidelity representation of the chirp in a cross-correlation operation. Detected chirps are used to determine a range between the emitting and receiving nodes and a shape measurement of the array.

21 Claims, 8 Drawing Sheets

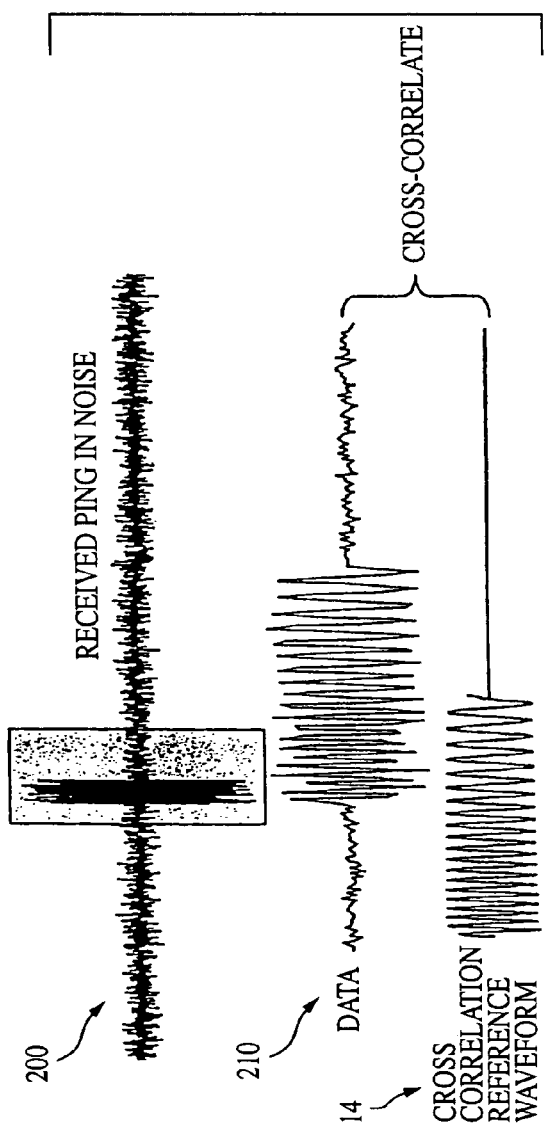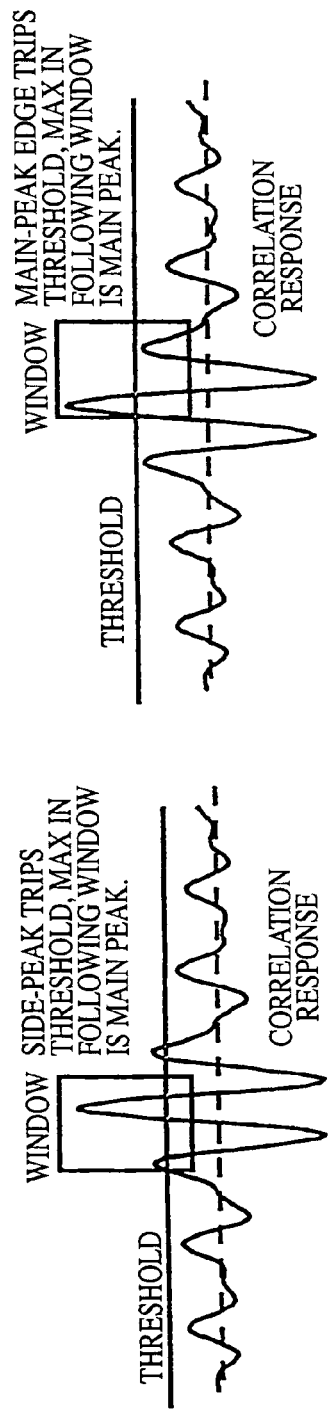
FIG. 6
FIG. 6a
FIG. 6b

MULTI-LINE TOWED ACOUSTIC ARRAY SHAPE MEASUREMENT UNIT

CROSS-REFERENCE TO RELATED APPLICATIONS

This application claims priority to U.S. Provisional Application No. 60/376,681, filed Apr. 30, 2002, the contents of which are hereby incorporated by reference herein.

STATEMENT OF GOVERNMENTAL INTEREST

This invention was made with Government support under Contract Nos. N00039-94-C-0001 and N00024-98-D-8124 awarded by the U.S. Navy. The Government has certain rights in this invention.

BACKGROUND OF THE INVENTION

1. Field of the Invention

The invention relates to shape measurement of towed, multi-line acoustic arrays.

2. Description of the Related Art

Towed multi-line acoustic arrays, also known as streamers, are known. Such acoustic arrays are used to detect ships, marine life, marine geology, etc. Streamers also have military applications. The node points of the acoustic array (also referred to as a lattice) are comprised, for example, of hydrophones that receive acoustic energy. The acoustic energy detected by the hydrophones may be generated by the feature detected itself, such as a marine animal. Alternatively, the acoustic energy may be a reflected signal, emitted by an acoustic source, such as a sparker or a boomer.

The data detected by the hydrophones is centrally processed to provide a detection, mapping, etc. of the feature. The hydrophones are connected through an electronic and processing backbone, which serves to coordinate and process the data received by the array. For example, if a boomer is used, timing is coordinated between the chirp of the boomer and the listening of the hydrophones. The waveform and timing of the acoustic energy received by the hydrophones is analyzed by the processing backbone to determine if it represents the same feature. In addition, once a feature is identified, its position can be determined by virtue of the timing and the relative positions of the hydrophones in the array. As is known in the art, this can be readily accomplished via generation of a set of simultaneous equations based upon the distance determined via the time of receipt of the acoustic signal by each hydrophone.

A fundamental problem is that the positions of the hydrophones or other items comprising the nodal points of a towed acoustic array are inherently unstable. Because of currents, position in the array, speed of the boat, or any other of myriad influences, the relative positions of the nodal points change continuously over time. It is thus important to also continually monitor the relative positions of the nodal points of the array. Various systems are used in the art for this purpose. A common system uses a multiplicity of "birds" that clip on the tow lines. Each bird comprises a transducer used for determining the range between nodal points. Thus, the backbone causes one bird to ping and the hydrophones of the nodal points to listen. The measured time of flight (TOF) is used to calculate the distance between the pinging bird and receiving hydrophones. The distances are used along with known quantities (for example, the distance between nodal points on the same line) in a series of simultaneous equations to generate relative distances between nodal points and, thus, the shape of the array.

The accuracy of knowing the shape of the array is highly important to the detection, analysis, etc. by the array. Although there are known systems that perform the above-described determination of the shape of the array, such systems generally rely on match filtering to the shape of the envelope of a continuous wave (CW) tone burst or to a pseudo-random sequence of tone bursts to measure TOF. Matching the shape of the CW leads to a loss of detail, which is then compensated for by using higher frequencies. This, however, results in attenuation, reduction of the range that can be measured, and susceptibility to reflections off of array components, bulkheads, etc. Thus, the present systems can only measure the relative positions of nodal points on the order of 50 cm or greater. Errors of this magnitude result in a degradation in the performance of the array.

In addition, it is noted that the use of CW tone bursts corresponds to use of the resonant frequency of the transducer. This results in a pressure waveform that includes startup and ending transient artifacts that interfere with detection and also uses a relatively narrow detection spectrum centered around the resonant peak.

In addition, as noted above, current systems that use CW tone bursts operating at higher frequencies must locate the emitting transducer external to the streamer hose wall to guarantee a clear acoustic path. This requires special means for attachment, deployment, storage, powering, etc. (for example, using birds as described above).

SUMMARY OF THE INVENTION

Among other things, the present invention greatly improves the measurement of the TOF by using a waveform where the details of the waveform that make up the envelope may be compared. Among other things, the present invention utilizes a hyperbolic frequency modulated (HFM) chirp, which has a singularity-like autocorrelation. (However, the invention includes other waveforms that can provide such a singularity-like autocorrelation, including, for example, a frequency modulated (FM) chirp.) Thus, the same resolution can be obtained while transmitting at significantly lower frequencies. (It is noted that obtaining details regarding the waveforms that make up the envelope doesn't work with a CW tone burst because of the huge sidelobes inherent to the autocorrelation of a CW tone burst, due to its periodic nature.) The lower frequencies allow the chirp to be well below the transducer's resonant frequency, thereby eliminating the problems associated with operating near resonance. In addition, the HFM waveform is modeled (using a Simulation Program with Integrated Circuit Emphasis (SPICE) program) to be devoid of startup and ending transients. In addition, the lower frequencies also allow the transducer to be included within the streamer hose, or nodes of the array, instead of being attached to the streamer, like birds.

Accordingly, the present invention comprises an acoustic array comprising a plurality of nodes attached to two or more lines. Some or all of the nodes include an emitting transducer and a receiving hydrophone. The remaining nodes in the array may only comprise a receiving hydrophone. Each emitting transducer has associated electronics comprising a high fidelity amplifier (for example, a closed-loop feedback amplifier, such as an operational amplifier) and a stored waveform input to the amplifier to drive the amplifier. The output of the amplifier excites the transducer to emit a chirp having a hyperbolic frequency modulated (HFM) waveform.

The frequency spectrum of each HFM chirp lies well below the resonant frequency of the transducer. Thus, the lowest frequency of the HFM chirp is generally at least one decade below the resonant frequency of the transducer and the highest frequency of the HFM chirp is generally at least one octave below the resonant frequency of the transducer. The transducer provides a signal having at least a 6 dB signal to noise ratio at the lowest frequency of the HFM chirp between the nodes of the array having the largest separation.

The chirp output by the transducer of a particular node is received as part of an acoustic signal by at least one of the hydrophones of the other nodes. The acoustic signal received is processed to detect each transmitted chirp. The processing of the acoustic signal comprises a cross-correlation operation using the received acoustic signal and a high fidelity representation of the HFM waveform of each emitted chirp (referred to below as the cross-correlation reference waveform).

A TOF between the node of the emitting transducer and the node of the at least one receiving hydrophone is determined based on detection of the chirp by the at least one receiving hydrophone. The TOF is used to determine the range between the node of the emitting transducer and the node of the at least one receiving hydrophone. The range between the node of the emitting transducer and the node of the at least one receiving hydrophone is used in a determination of the shape of the array.

The HFM waveform of the chirp is modeled using, for example, a SPICE program. The SPICE model comprises a closed-loop feedback structure and also includes the transfer function of the transducer.

BRIEF DESCRIPTION OF THE DRAWINGS

FIG. 6 graphically represents aspects of the cross-correlation processing of a received acoustic signal;

FIGS. 6a and 6b represent the thresholding of a correlation response determined by the processing.

DETAILED DESCRIPTION OF THE PREFERRED EMBODIMENTS

Figure 1:
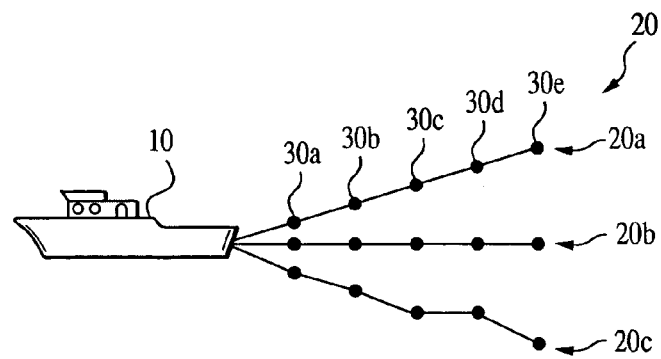
FIG. 1 is a representation of a towed array that supports the present invention.

FIG. 1 is a representative diagram of a top view of a ship 10 towing a towed-line array 20 in accordance with the present invention. Three lines 20a, 20b, 20c of the towed line array 20 are shown in FIG. 1. Additional lines and nodal points may be present but for simplicity are not shown in FIG. 1. In addition, lines and nodes of the same line may also be at different depths in the water. In addition, as represented by line 20c, the nodes of a line may not lie in a straight line when viewed from above.

Each line has a series of nodal points, such as 30a–e shown for line 20a. Each nodal point comprises a hydrophone and, for a periodic subset of these nodal points, a transducer and supporting electronics used to generate the shape measurement of the array in accordance with the invention.

Figures 1, 1A:
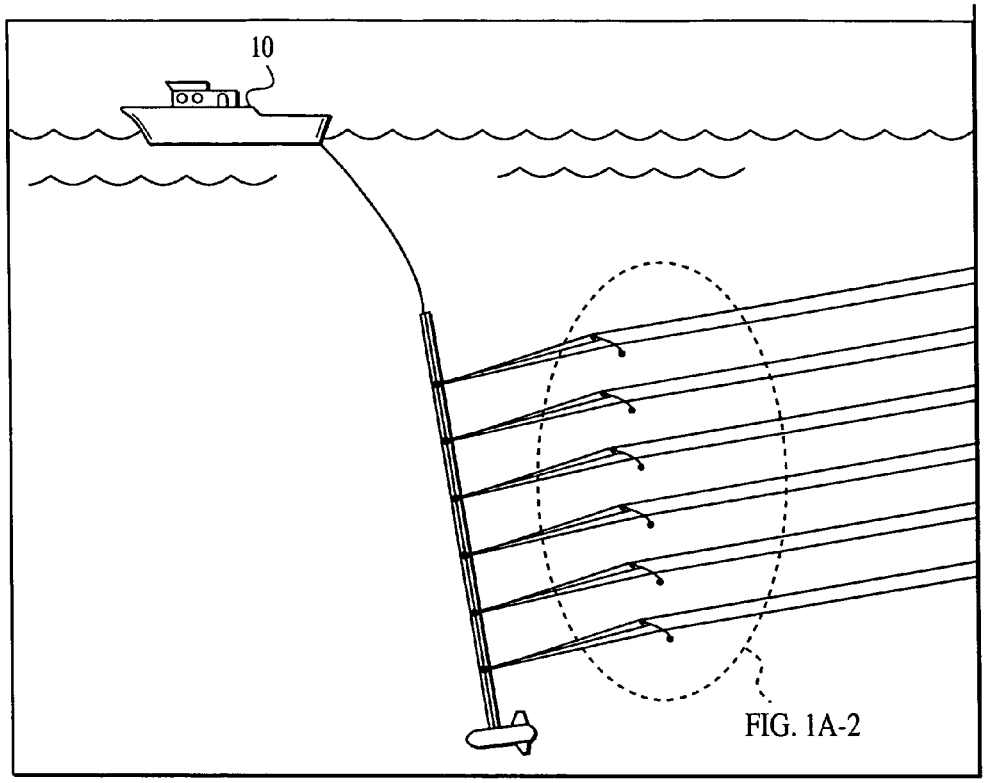
FIG. 1a is a more detailed representation of a towed array that supports the present invention.
Figures 1, 1A, 2:
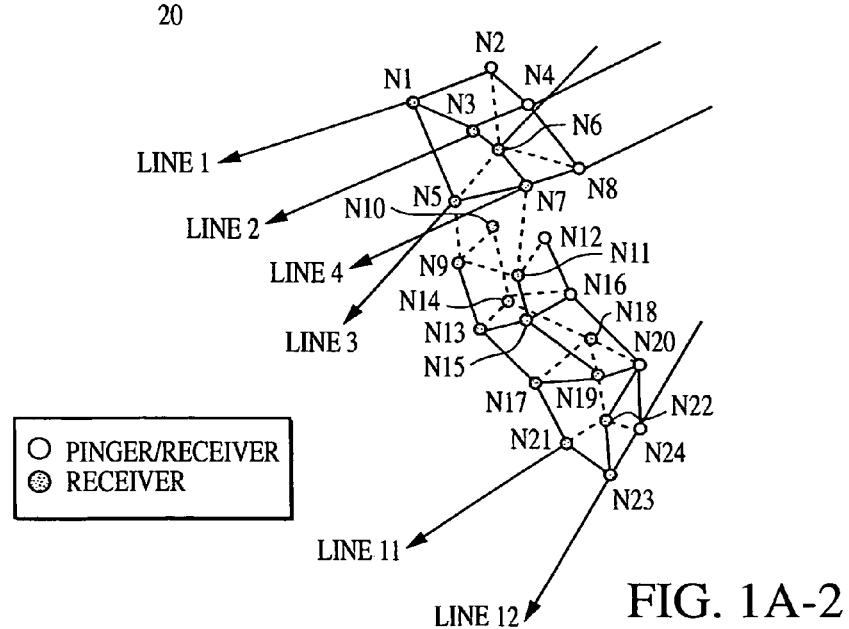

FIG. 1a is another more detailed representative diagram of a ship towing a towed-line array 20 in accordance with the present invention. The inset of FIG. 1a shows a more detailed portion of the array. In the detailed portion, for example, nodes N1, N3, N5, N7, N9, N11, N13, N15, N17, N19, N21 and N23 comprise both transducers and receivers, and the rest of the nodes shown in the inset include only hydrophones.

Figure 2:
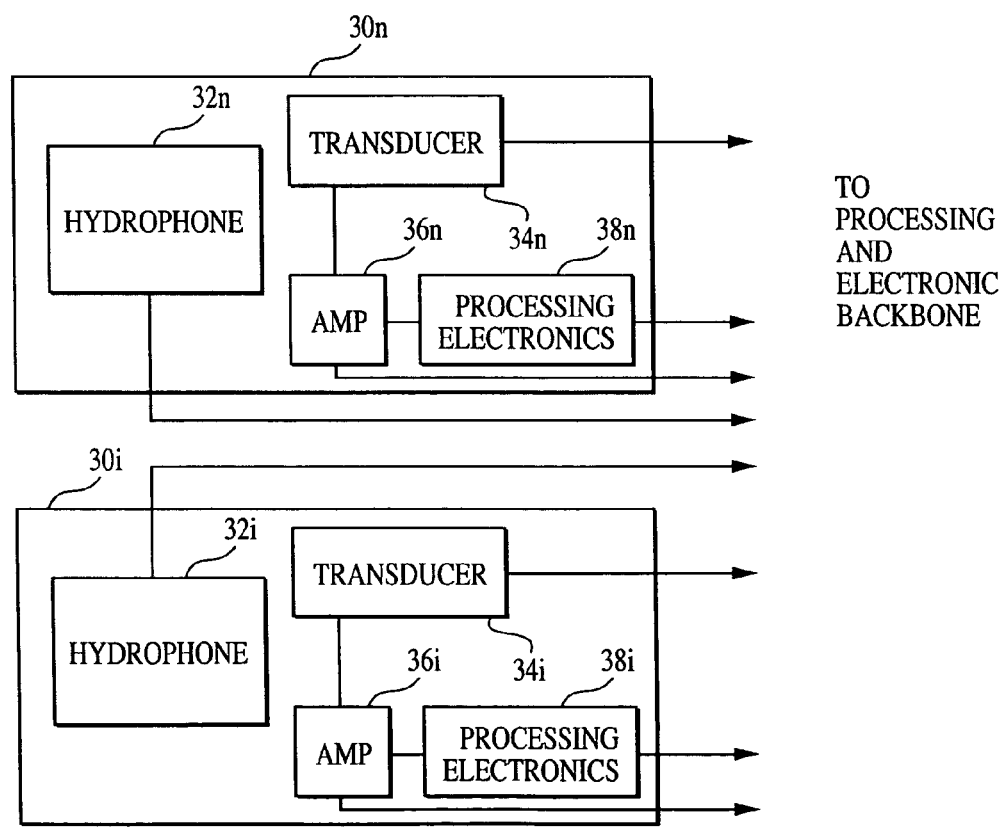
FIG. 2 are components of two representative nodes of the array of the present invention.

FIG. 2 is a representation of two of the nodes 30n and 30i of the towed line array of FIG. 1 in accordance with the invention. The two nodes are representative of nodes having both a hydrophone and a transducer, used in shape measurement. However, it is noted that the description of the hydrophones with respect to nodes 30n and 30i applies equally to those nodes that only have hydrophones (i.e., without transducers). Node 30n is focused on for the description. Included in node 30n is a hydrophone 32n, which may be used to receive acoustic signals generated by ships, marine life, etc. for analysis. Hydrophone 32n also receives acoustic waveforms (chirps) from transducers in other nodes, such as transducer 34i. Hydrophone 32n is connected with a processing- and electronics backbone that generates timing signals for listening by the hydrophone, as well as receiving the acoustic signals received from hydrophone 32n and other hydrophones in other nodes (such as hydrophone 32i) for analysis.

Node 30n also includes transducer 34n, amplifier 36n and related processing electronics 38n. Transducer 34n generates an acoustic chirp that is received by the other hydrophones in the array and used by the processing and electronics backbone to determine the shape of the array, as described in more detail below. The waveform of the chirp generated by transducer 34n is excited by power operational amplifier 36n.

In general, a high fidelity amplifier is required that provides a high fidelity reproduction of gain, frequency, and phase. Such a high fidelity amplifier is provided, for example, by a closed-loop feedback amplifier, such as an operational amplifier. The operational amplifier will be used throughout the description as the preferred embodiment, although it is understood that any like high fidelity amplifier may be used.

Amplifier 36n is in turn controlled by processing electronics to generate an appropriate signal to drive the transducer 34n to output the desired acoustic waveform. Processing electronics 38n and amp 36n are connected to the processing and electronics backbone, which controls the timing of the chirping of transducer 34n so that the other hydrophones of the array (such as hydrophone 32i) are listening when transducer 34n is chirped.

It is understood that the division between the processing electronics 38n in the node 30n and the processing and electronics backbone is somewhat arbitrary and may be more or less centrally located in the backbone. In the preferred embodiment (as described below), the chirp emitted by a transducer is generated entirely within the node.

Thus, the processing electronics 38n includes a D/A converter having a pre-stored signal that drives the op-amp 36n such that the transducer 34n is excited to emit the desired acoustic waveform (chirp). The processing and electronics backbone in that case supplies a timing signal to the node's processing electronics 38n to coordinate emission and reception of chirps among the nodes of the array. (in this and like embodiments, where the transducer and its electronics are largely contained in the node, the collective components are referred to as a "shape measurement unit" or "SSMU".) However, as noted, more or less of the components and processing may occur in the backbone. For example, the signals to the op-amp 36n may be generated in the backbone and transmitted to the op-amp 36n of the particular node due to chirp.

Similarly, the hydrophone 32n of the array may include some portion of the processing electronics in the detection of a chirp. In a preferred embodiment, as described below, the hydrophone includes a preamplifier and an A/D converter that samples a received acoustic waveform. The sampled waveform is then sent to the backbone for processing, for chirp detection and range measurement.

Similarly, when the transducers of other nodes, such as transducer 34i, are chirped in sequence by the timing provided by the backbone, hydrophone 32n of node 30n (and other hydrophones in the towed array) listen for the signal and provide it to the backbone, which correlates the received signals to the chirp of the particular nodes. As noted above, the listening hydrophones may be in a node comprising a transducer/hydrophone (emitting/receiving) pair (such as nodes 30n, 30i), or may be in a node comprising a hydrophone without a transducer.

For simplicity, the description will focus on generation of a chirp by one node (such as 30n) and receipt by another node (such as 30i) for processing. However, it is understood that this is representative and that each node that includes a transducer or streamer is chirped in a controlled sequence and that when a particular node such as node 30n chirps, it is received by the hydrophones of a number of the other nodes for processing. (Typically, a chirp emitted by a particular node on one line of the array is received by the nodes on the other lines.) As described further below, this provides the data for determining the shape of the array.

In a preferred embodiment of the invention, the entire details of the received waveform that make up the envelope of the chirp is used by the backbone to more accurately measure the TOF. A hyperbolic frequency modulated (HFM) chirp is generated and output by the transducer 34n into the water, since its changes in time are linear in the period domain and hyperbolic in the frequency domain.

An "ideal" chirp is first created in tandem with selection of a suitable transducer and design of a corresponding amplifier. As noted, it is highly desirable to transmit acoustic energy at lower frequencies (typically lower than 25 kHz to prevent reflections from objects within the array). In designing the waveform, several parameters are optimized. Sound propagates farther at lower frequencies, but transducers that can transmit at these frequencies are generally large. To transmit at these frequencies in the confines of a node, it is necessary to choose a smaller transducer and operate well below resonance, thus requiring large driving voltages. In order to minimize the required driving voltage at such low frequency, it is preferable to select the largest omni-directional transducer that fits comfortably within the node. In general, although the driving voltage will still be relatively large, the largest transducer that fits within the node will require the lowest driving voltage at the low operating frequencies.

A design parameter of the system is that the transducer provides a Source Level (SL) adequate to supply on the order of at least 6 dB of signal to noise ratio (SNR) at the worst-case receiving hydrophone's range. Because the transducer will be operating below resonance, the required SL determines the lowest frequency used in the waveform, which is the lowest frequency that will provide the requisite SL by the selected transducer. Other considerations are taken into account in selection of the transducer. For example, the frequency range must not interfere with or alias back into other acoustic sensors in the towed system. In addition, certain naturally occurring acoustic bands should be avoided, such as the frequency generated by rainfall, snapping shrimp, etc. In addition, any waveform designed must not be so close to other waveforms in the system that they cross-correlate.

The lowest frequency that provides the requisite SL is used as the left hand boundary of the design of the "ideal" chirp waveform. It is readily observed why the HFM chirp is desirable: As noted, the transducer will generally be operating well below its most efficient operating point, resonance. In general, the highest frequency is generally on the order of at least an octave below the resonant frequency and the lowest frequency is generally on the order of a decade or two below the resonant frequency. Thus, at the starting frequency of the waveform (i.e., the lowest frequency), the transducer must be driven on the order of ten times harder (or more) than at resonance. Thus, it is important to choose a waveform that does not dilute energy into multiple frequencies at once. As noted, the HFM chirp is suited for this requirement since it slews linearly in period space, so that at each instant of time all the energy is focused at a single frequency.

The operational amplifier is preferably selected to have the lowest quiescent power that will provide a voltage swing and current capable of driving the transducer to provide a Source Level (SL) adequate to supply at least 6 dB of signal to noise ratio (SNR) at the worst-case receiving hydrophone's range. In addition, the up HFM chirp has the additional advantage of requiring a lower voltage swing for the same acoustic output level as a function of time. This allows a low-power power supply to be used in conjunction with the op-amp, rather than a power supply that needs to handle the maximum current draw at the maximum voltage throughout the chirp. In the low-power power supply, energy is stored in high voltage capacitors. As the waveform progresses, i.e., as less voltage swing is required, energy is drawn from the capacitors lowering the supply voltage across the op-amp. Because less voltage swing is required over time, with the proper selection of capacitance value, the amplifier output will never saturate.

Figure 3:
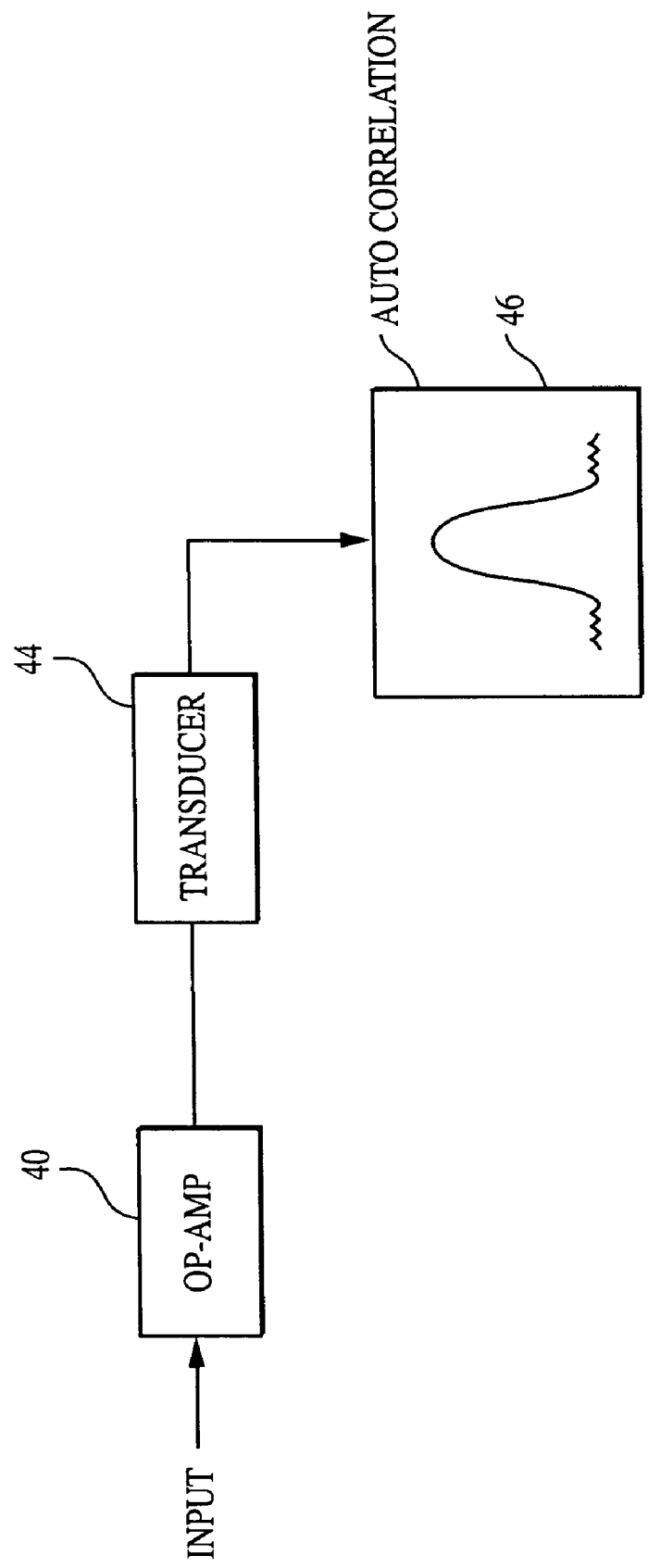
FIG. 3 represents modeled components in designing the "ideal" waveform of the present invention.

The "ideal" HFM up chirp is designed by computer modeling of the selected transducer. FIG. 3 is a representative diagram of the model of the op-amp and associated capacitors 40 that is used to drive a transducer 44, both selected in accordance with the above description. (The model of FIG. 3 includes the transfer function of the transducer in block 44, but does not include the transfer function of its eventual op-amp in block 40.) The op-amp input is generated and manipulated to provide the desired acoustic waveform output by the transducer 44, namely, an HFM up chirp that begins at the lowest frequency that provides the requisite SL from the transducer 44 and is in accordance with the above description. The chirp starts at the lowest frequency that provides the requisite SL and is designed to have minimum side-lobes when submitted to an autocorrelation function. The upper frequency and/or the duration of the chirp is increased until the autocorrelation function exhibits a low equal amplitude ripple with a single, narrow correlation spike. Typically, on the order of a doubling of the lowest frequency is required to even the side-lobes. Increasing the time duration (or the number of cycles to complete the chirp) will lower the side-lobe ripple amplitude. The ideal HFM up chirp is further designed to start with a positive pressure sine wave and end at or close to a zero crossing.

Figure 3A:
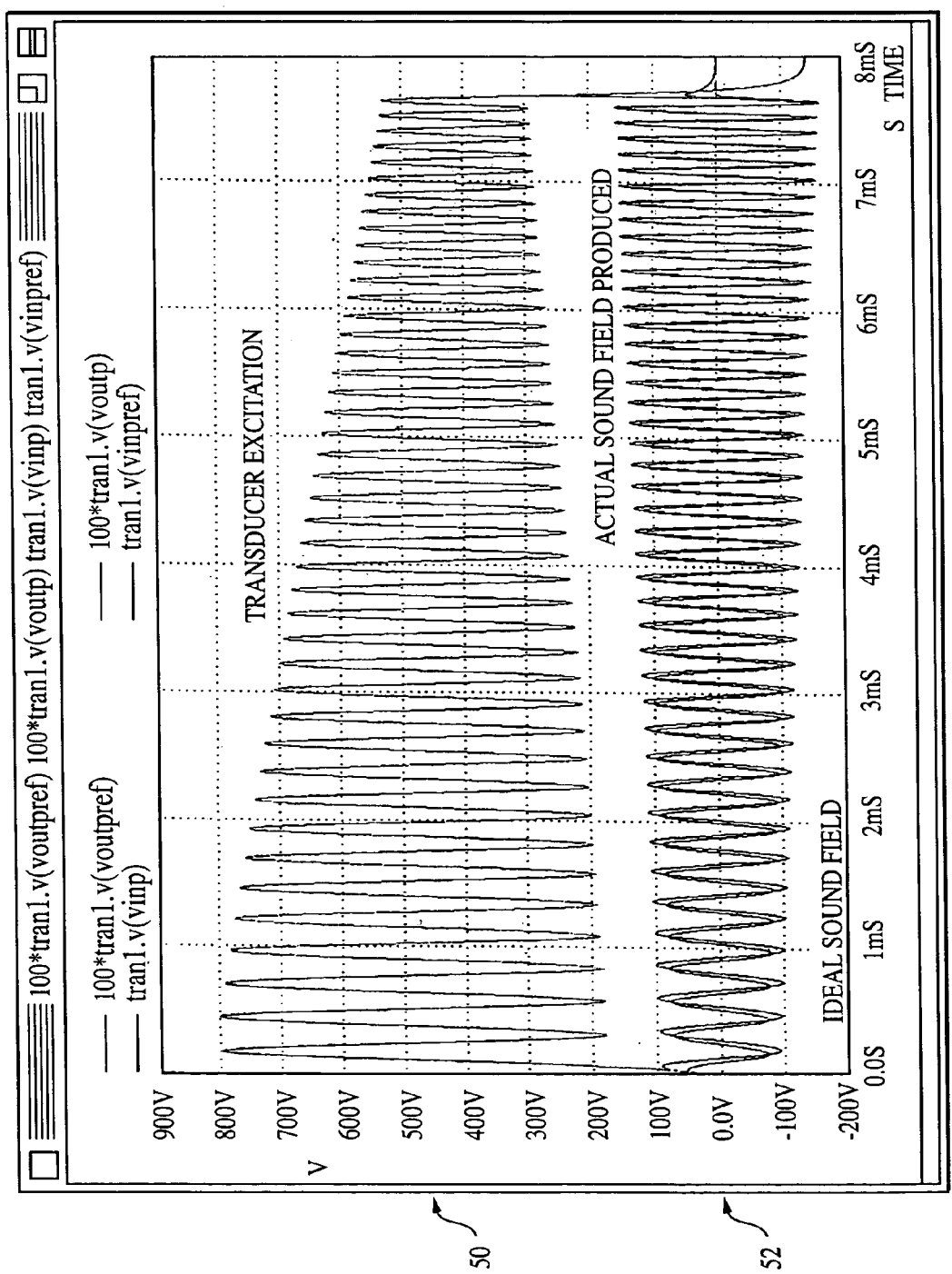
FIG. 3a represents modeled amplifier output and acoustic output corresponding to the design of the "ideal" waveform of the present invention.

The autocorrelation modeled and shown in FIG. 3 is also representative of when the ideal simulated HFM up chirp is achieved. That is, the autocorrelation function 46 has a single narrow correlation spike with equal amplitude ripples. Referring to FIG. 3a, a representation of the transducer excitation signal 50 output by the op-amp that generates a reasonably "ideal" HFM up chirp 52 is shown. As seen, the magnitude of the output of the op-amp decreases with increasing frequency, which nonetheless serves to maintain the SL output by the transducer at the high end of the chirp.

The "ideal" HFM up chirp output by the transducer 44 is ideal in the sense that, if received by a hydrophone without alteration, would be readily detected due to the signal to noise ratio parameters, and would also be correlated with a reference waveform based on the details of the transmitted waveform, thus making the TOF measurement highly accurate.

Instead of outputting the "ideal" acoustic waveform as designed by the transducer, the waveform is further modeled so that the acoustic waveform of the chirp ultimately output by the transducer (for example, transducer 34n in the array of FIG. 1) is designed and produced to pre-compensate for underwater acoustics, non-linearities in the system components, etc. Thus, the actual acoustic waveform generated for transmission through the water and receipt by the hydrophone in the array (such as hydrophone 32i) is based on the ideal waveform, adjusted to take into account the significant component and environmental deviations from the "ideal" in the actual implementation of the system.

Figure 4:
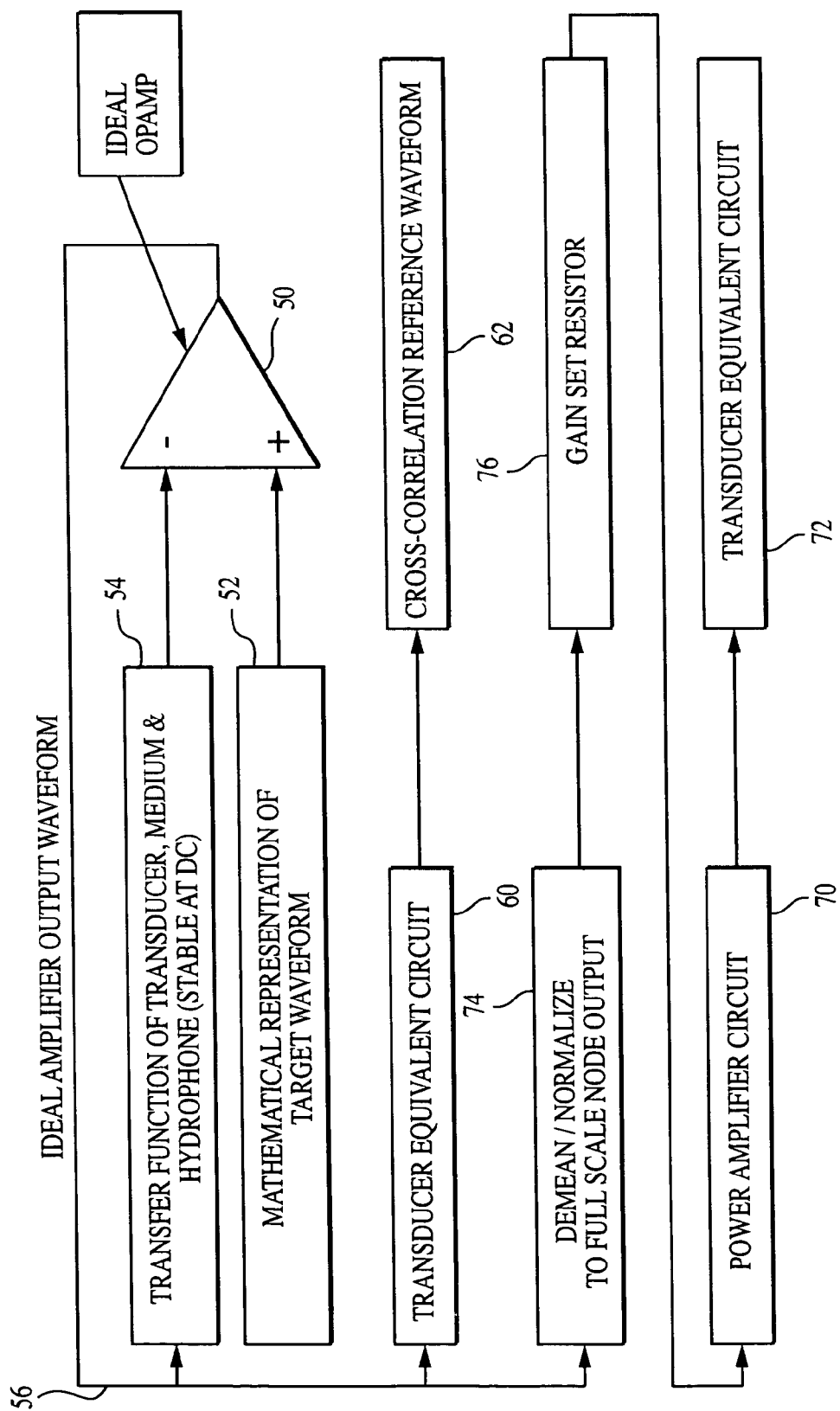
FIG. 4 represents aspects of a SPICE modeling used to model a cross-correlation reference waveform and related signals.

Referring to FIG. 4, the additional modeling of the waveform is described. The high fidelity model of the intended in-water waveform is created by concatenating appropriate mathematical functions in the analog electronics simulation package SPICE or equivalent. FIG. 4 represents a portion of the modeling by use of the SPICE program. Thus, the positive input of the ideal op-amp 50 is provided with a mathematical (or voltage) representation 52 of the "ideal" or target acoustic waveform, as described above.

Mathematical functions of principle system and environmental influences that will be present in the real-life system are modeled 54 and used to generate the negative input to the idealized op-amp 50. Thus, for example, the transfer function of the selected transducer, the effect of the medium on the acoustic waveform, and the transfer function of the hydrophone are modeled in the SPICE program. (The transfer function of the selected transducer is for the transducer that was used in modeling the ideal waveform described above.)

These functional models are pieced together in series (concatenated) in the SPICE program and the output of the final component (or other item) in the concatenation is supplied to the op-amp's negative input. The input 56 supplied to the first functional model of model block 54 is the output of the ideal op-amp 50.

Once the SPICE modeling process converges to a stable design, the output of the op-amp 50 provides a mathematical or voltage representation that excites the transducer to create the desired acoustic waveform that accounts for the system and environmental influences.

The SPICE model includes provision to smooth the tail end of the waveform (chirp) output by the op-amp 50 to zero. This avoids creation of a discontinuity in the waveform, which will cause the modeled transducer to ring-up around its resonant frequency. (Such transients at or near resonance emitted by the transducer being driven with the high input described above (on the order of a decade or higher than normally used at resonance) would create an acoustic signal that would overwhelm the receiving hydrophone.)

The model also includes provision to ramp the amplitude linearly as a function of time. This compensates for the reduction of time presented at each frequency in a Fast-Fourier Transform (FFT) of the waveform (described further below), so that the waveform has substantially equal power in frequency space at all frequencies.

As noted above, the SPICE model includes modeling in model block 54 of the transfer function (equivalent circuit) of the actual transducer selected. A piezoelectric transducer typically has a significant amount of capacitance, and a coil transducer typically has a significant amount of inductance. These reactive terms create a lag in the transducer's response to the input excitation waveform. This lag is compensated in the SPICE model of the transducer (among other items described above) so that the ideal waveform is adjusted so that the actual acoustic output of the actual transducer takes the reactive terms and other transducer components into account.

It is noted that in modeling a piezoelectric transducer in model block 54, the feedback loop including the op-amp 50 will be inherently unstable at DC since there is not a resistive or inductive path all the way to the transducer's output. A high value resistor is therefore added to the model to bridge the series capacitor in the series RLC equivalent circuit. The value of the resistor is chosen to provide just enough resistance to maintain stability. It is noted that, because the model of the upper loop includes the bridge resistor, it changes the phase response of the transducer in block 54 slightly. It is also necessary to use an attenuated version of this signal as the input to a SPICE representation of the power op-amp (simulating the digital to analog (D/A) converter described below), as well as the actual transducer (described below).

As noted above, once the SPICE modeling process converges to a stable design, the output of the op-amp 50 provides a mathematical or voltage representation that excites the transducer to create the desired acoustic waveform that accounts for the system and environmental influences. This waveform is further used by the SPICE program to model the cross-correlation reference waveform used with the hydrophone to detect the acoustic waveform emitted by the transducer, as well as to model the input used to drive the power operational amplifier used to excite the desired acoustic waveform by the transducer.

As further shown in FIG. 4, the SPICE model includes a SPICE representation of the actual power op-amp 70 and transducer 72 (without a bridge resistor) as previously selected. The waveform output by ideal op-amp 50 is pre-processed by blocks 74, 76 in order to adjust and attenuate the waveform to account for the bridge resistor used in the transfer function of block 54. The waveform output by ideal op-amp 50 is centered around zero because of the resistor (i.e., the resistor creates a DC compliant waveform). The processing of block 74 thus shifts (demeans) the waveform to suit the voltage range of the amplifier 70, and also attenuates (normalizes) the waveform to the range of the D/A. The gain set resistor block 76 provides re-acquisition of the AC (non-DC) portion of the ideal waveform.

The output of blocks 74 and 76 provide an appropriately scaled voltage waveform for exciting the transducer 72 to produce the desired acoustic waveform. The waveform is input into the SPICE model of the actual power op-amp 70 and transducer 72, where additional manipulation of the waveform is performed. Thus, the duration (terminating phase angle) is iterated and tail-end smoothing is provided to produce a clean HFM Up Chirp without abrupt startup or ending transients. Suppression of the long asymptotic exponential decay that appears is unnecessary, since it is due to a parallel reactive component in the transducer and has no impact on what is put into the water as sound (a resistive component).

The high fidelity waveform input into the SPICE representation of power op-amp 70 is re-sampled at a frequency adequate to faithfully reproduce the waveform from a D/A converter. As described further below, it is this sampled waveform that is used in the nodes of the array as the input to the actual power op-amp selected, which then drives the selected transducer to provide the desired acoustic waveform. The sampled waveform is thus programmed into a D/A converter having a commensurate sampling rate, which supplies the input to the selected power op-amp of the nodes. (Although the D/A converter is generally referred to alone, it is understood that the D/A staircase output includes undesirable high frequency components and is thus filtered to eliminate these components from the waveform input to the op amp.)

As further shown in FIG. 4, the SPICE model also includes a mathematical model of the transducer equivalent circuit 60 for generating a cross-correlation reference waveform, represented by block 62. (The transducer equivalent circuit 60 is again the same as the transfer function of the transducer of model block 54, but without the bridge resistor.) The cross-correlation reference waveform is a sampled representation of the actual acoustic waveform output by the transducer and is used to accurately detect the received chirp by the receiving hydrophone in the system. The cross-correlation waveform includes the frequency details within the envelope, as described above; thus its use by the processing electronics of the actual system in detecting a received waveform by a hydrophone in a node results in a highly accurate calculation of the TOF from the emitting transducer of another node in the array.

To generate the cross-correlation waveform, the output of the op-amp 50 is input to the transducer equivalent circuit 60. As previously described, the input to the transducer equivalent circuit 60 is the voltage representation of the waveform used to drive the transducer to produce the desired acoustic waveform or chirp (which accounts for system and environmental influences). Thus, the output of the transducer equivalent circuit 60 is a mathematical or voltage representation of the desired actual acoustic waveform. (As an aside, it is noted that the output of the ideal power op-amp 50 is input directly into transducer 60 in the cross-correlation reference waveform loop, but is effectively input into the amplifier 70 in the lower loop, because the simulated amplifier 70 is of such high fidelity, the waveform output by the amplifier if very close to the input waveform.)

The transducer 60 output is re-sampled at a sampling rate that faithfully reproduces the acoustic waveform output by the transducer equivalent circuit 60. The sampled waveform provides the cross-correlation reference waveform 62. As noted, the cross-correlation reference waveform is used in the processing electronics of the system to compare with acoustic signals received at a hydrophone of a node of the array to accurately detect a chirp emitted by a transducer of another node. The sampled waveform comprising the cross-correlation reference waveform 62 is sampled with sufficient resolution for FFT analysis, as will be described below. It is noted that the sampling rate of the A/D converter required for FFT analysis (described below) is generally less than the sampling rate of the D/A converter input that drives the amplifier. The sampling rate used for generating the cross-correlation reference waveform 62 also corresponds to the equivalent sampling rate of a zero-padded waveform, as will also be described below.

The hardware used to implement the system and array is further designed at this point. Fundamentally, the power op-amp and the transducer used to generate the chirp by each node has already been selected (and was used in the modeling detailed above). The actual desired chirp output by the selected transducer, which accounts for the transducer transfer function and other system and medium influences, has also been modeled. The desired acoustic waveform or chirp is excited from the transducer by driving the power op-amp with the output of the D/A converter programmed with the sampled waveform as described above with respect to element 70 of FIG. 4. Thus, the D/A that will faithfully reproduce the sampled waveform is chosen and connected to the selected power op-amp and transducer. The waveform output by the D/A is typically programmed into a non-volatile memory located in each transmitting node.

It is noted that the selected power op-amp and transducer supplies the amp 36n and transducer 34n of a node n as described with respect to FIG. 2 above (as well as the other nodes of the array that include transducers). The D/A converter programmed with the sampled waveform is represented by the processing electronics 38n of FIG. 2.

A hydrophone, low-noise preamplifier and A/D converter that will faithfully capture, with high fidelity, the highest frequency in the acoustic waveform is required for each node of the array. (It is noted that the hydrophone provides the hydrophone 32n of node n shown in FIG. 2, with the preamplifier and A/D either included in the hydrophone, or represented within the upstream backbone.) The A/D selected samples long enough to capture the length of the waveform plus the worst-case TOF expected for the array during operation (i.e., farthest separation between a transmitting and receiving node). Typically, this sampling rate is much higher than the continuous sampling rate used by normal acoustic channels (examining features of interest), so A/D data is often stored temporarily in a First-In First-Out Buffer (FIFO) and sent upstream via the backbone at the continuous rate for reconstruction and detection processing topside.

Figure 5:
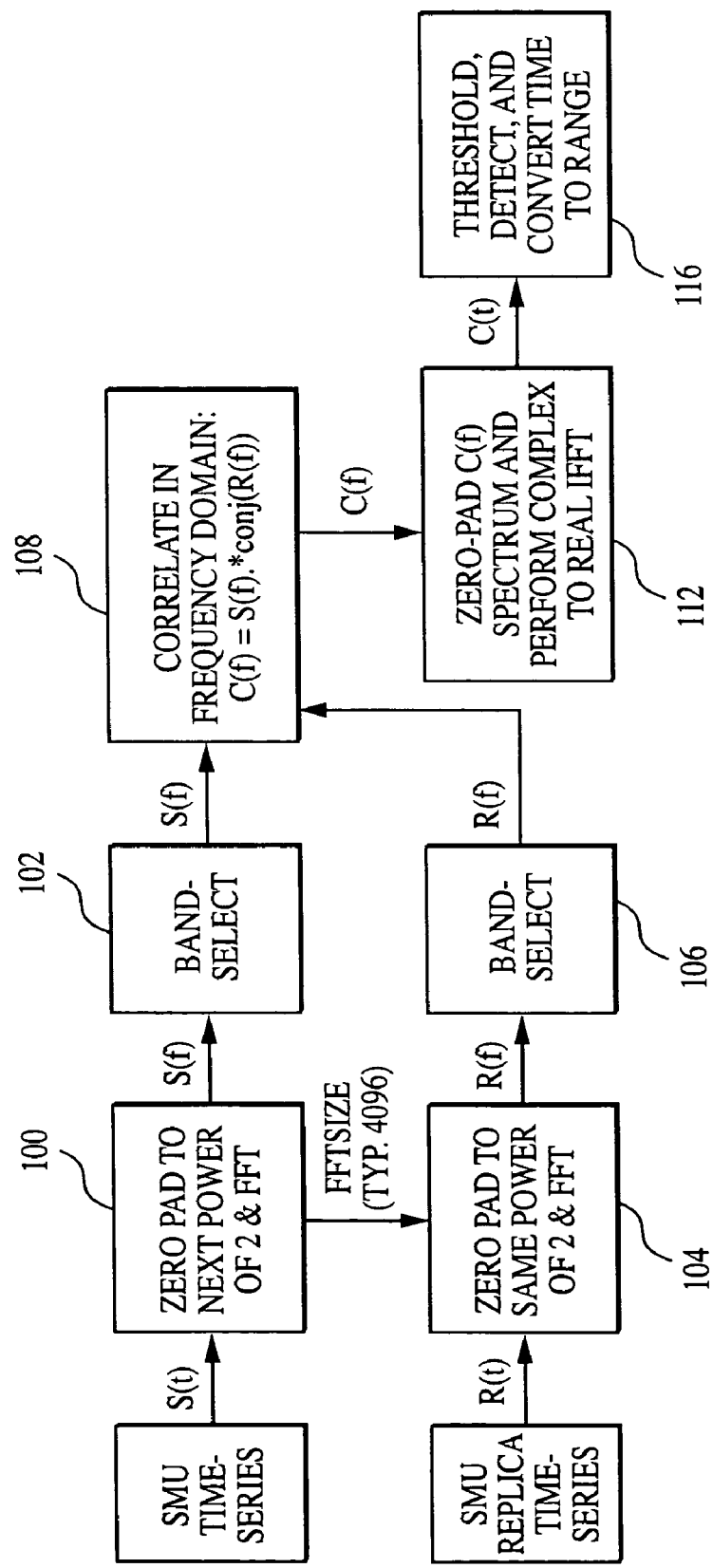
FIG. 5 represents a number of processing blocks in the detection of a chirp.

Acoustic waveforms so received by the hydrophone are processed either in the node or in the processing and electronics backbone (or some combination thereof) to detect chirps emitted by the transducers of other nodes. FIG. 5 is used to represent the processing implemented to determine whether a received acoustic signal is an acoustic waveform emitted by a transducer (i.e., a chirp). After the time-series S(t) captured at the receiver is transmitted shipboard, it is zero-padded to the next power of two and the complex spectrum S(f) is calculated using a Fast-Fourier Transform (FFT) 100. This frequency spectrum is then narrowed to contain only the predominant band of energy from the transmitted ping 102. This band-selection step improves the signal-to-noise of the final correlator output by removing noise that is outside of the band of interest. Similarly, the same FFT 104 and band-selection 106 processes are performed on the pinger waveform (or replica or cross-correlation reference waveform) R(t) to compute the complex replica spectrum R(f). The complex frequency-domain correlation is calculated 108 by multiplying, point by point, the receiver band spectrum S(f) by the conjugate of the replica band spectrum R(f). The temporal correlation function C(t) is then calculated by first zero padding the spectrum C(f), and then performing a complex to real inverse Fast-Fourier Transform (IFFT) 112 to provide the desired up-sampled correlation time-series output. (The zero padding can be on the order of 4 to 16 times, depending on what the fidelity or the ratio of processing time to power permits.) This zero-padding has the effect of increasing the time (sampling) resolution. It also improves the ranging accuracy and reduces cross-over loss in the correlator which increases the sensitivity of the detector.

Thresholds 16 are created for the time domain data to identify cross-correlation peaks. A Monte-Carlo analysis of the acoustic signal versus simulated acoustic noise (based on typical ocean spectra, for example) may be used to initially set an appropriate threshold. It is noted that actual acoustic data from areas where the system may be operated is preferred because it will identify if the constructed chirp resembles a naturally occurring biological signal. In that case, the chirp will have to be modified.

FIG. 6 is a representative diagram of a number of aspects of the correlation processing. The received ping (chirp) and noise, as received by a hydrophone, is represented by ref. no. 200. Ref. no. 210 represents the portion of the received signal that includes the ping that is sampled and analyzed in the backbone, by cross-correlation analysis with the cross-correlation reference waveform 214. The cross-correlation processing is as described above with respect to FIG. 5. The correlation response (output of the cross-correlation operation, after the inverse FFT) is represented in FIGS. 6a and 6b. The threshold is set such that, once the threshold is tripped, the maximum peak in a following time window is taken as the main peak. This allows for a variance in the threshold level that still identifies the main peak in the correlation response. Thus, in FIG. 6a, where a side peak trips the threshold, the maximum peak in the window is the main peak. In FIG. 6b, where the threshold is higher and tripped by the main peak itself, the maximum peak in the window is still the main peak.

Detection of the chirp by the processing also provides the TOF between the node of the emitting transducer and the node of the receiving hydrophone. The TOF is used with the speed of sound of the medium (e.g., seawater) to determine the line-of-sight distance (also referred to as the "range") between the two nodes. As described below, measuring (or otherwise knowing) the range between a sufficient number of the nodes in the array may be used in a series of simultaneous equations that can be solved to provide the current shape of the array.

If the hydrophone receives multiple chirps, then the processing will detect multiple cross-correlation peaks. In that case, the processing backbone sorts chirps according to the emitting node (transducer) based on the timing of signal emission in conjunction with the nominal geometry of the array.

In further design and implementation of the system comprising the array, determination of a "correlation delay" is determined and factored into the processing used to determine TOF and thus the shape of the array. The correlation delay refers to the delay offset due to the components, signaling, processing (such as FFT processing) and other delays associated with the particular system implementation. The delay associated with the particular embodiment must be subtracted from the measured time in order to obtain a TOF. The delay may be determined by use of a prototype or actual hardware, preferably by setting up an emitting transducer and a receiving hydrophone at a quarry, in a large quiet room, or other setting where the distance and speed of sound are precisely known. (The setting is also configured so that multiple acoustic paths do not interfere with measurement of a direct TOF.) The distance and speed of sound are used to calculate a precise direct-path TOF. Then, the TOF is measured by emission and reception of a chirp between the transducer and hydrophone, along with the correlation processing described above. The difference between the measured and calculated TOF is the correlation delay that is then subtracted in the processing to obtain an accurate TOF result.

Alternatively, the correlation delay may be determined electronically, for example, by creating a link where generation of the transducer chirp immediately supplies a simulated waveform to the hydrophone. In that case, the actual TOF is effectively zero; thus, the measured TOF by the system equals the correlation delay.

In further design and implementation of the system comprising the array, a chirp is received by the hydrophone of a particular node, detected by the cross-correlation processing, and identified as being emitted by a particular node based on the timing of emission and receipt of the nodes as also controlled by the processing backbone. As described above, when a chirp is identified, the TOF is measured as the time between the transducer's emission of the chirp and the hydrophone's receipt, as adjusted by the correlation delay. The range between the emitting and receiving node is calculated by multiplying the TOF by the effective speed of sound. The effective speed of sound must be measured continuously and accurately, in order to ensure an accurate measurement of the range.

Sound speed varies with depth in what is referred to as a Sound Speed Profile or Sound Velocity Profile (SVP). The effective sound speed between two depths in water (such as the depth of the node of an emitting transducer and the node of a receiving hydrophone, also referred to as a "pinging-receiving pair") is calculated via the harmonic mean using as much spatial resolution as possible to increase accuracy. Attaching conductivity, temperature and depth (CTD) sensors to the towed array, which collectively provide sufficient data to calculate sound velocity, can help to maintain a continuous SVP. As noted, the effective sound speed is multiplied by the TOF in the processing to determine the range between the pinging-receiving pair.

Another way to determine the sound speed is by obtaining a TOF measurement across a known distance within the same array. The TOF and distance can be used to calculate the sound speed at the depth that the array is currently operating. The current sound speed is then used by the processing in the range determinations for pinging-receiving pairs. In this approach, careful quality control must be observed in fabricating arrays to ensure that the known distance between nodes or other modules is to within a tolerance of 1 cm. In addition, any stretch in the tow lines under dynamic load conditions of the module must be accounted for in this technique.

As noted, the above-described system provides a highly accurate determination of range between pinging-receiving pairs of nodes of a towed array. The processing and electronics backbone of the array causes a sequential chirping of transducers in the nodes of the arrays. Each chirp emitted by a node is received by the hydrophones of the other nodes of the array, and the backbone processes the signals received by the hydrophones of the other nodes in the array. (Because the distance between nodes on each towed line are fixed, the processing generally does not determine distances between nodes of the same line.) The cross-correlation processing results in detection of the chirp received. Focusing on a particular node, the nominal time between chirping and receipt by a hydrophone (in conjunction with the nominal geometry of the array) allows the processing to identify the particular node emitting a signal. The detected TOF is adjusted by the correlation delay, and the range between the emitting and receiving node is determined using the TOF and sound speed, as described above.

Figure 7:
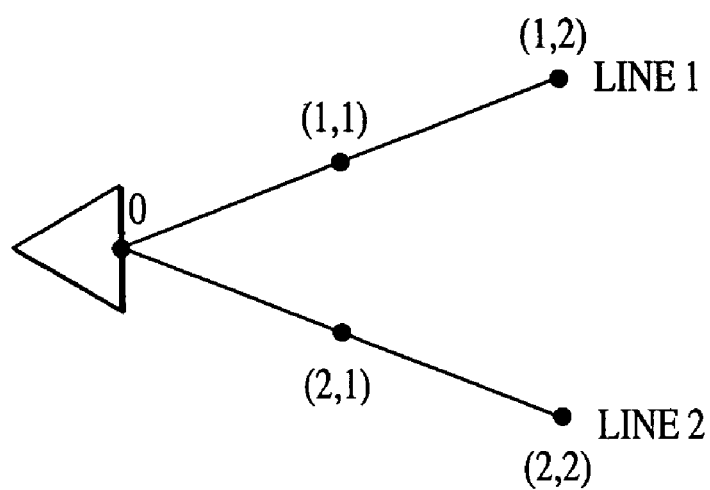
FIG. 7 is a simplified version of a towed array that supports the present invention.

When a sufficient number of ranges are measured between respective nodes of the array (or known, as in the case of nodes of the same line), the processing backbone may readily calculate the shape of the array by generating and solving a series of simultaneous equations. FIG. 7 is used to represent this in a simplified case of two lines each having two nodes. The range measured (or known) is the direct (line-of-sight) distance between nodes. Thus, the range is known between nodes (1,1) and (1,2) and between nodes (2,1) and (2,2), because they are each on the same line. Assuming, for simplicity, that each node comprises a transducer and receiver, the system measures the range between nodes (1,1) and (2,1); (1,1) and (2,2); (2,1) and (1,2); and (1,2) and (2,2). This provides six known distances.

The "shape" of the array can be envisioned, for example, by knowing the relative positions of the nodes. The above-noted distances, along with a number of geometric relationships between the nodes (based, for example, on the law of cosines) are used to generate a set of simultaneous equations that may be solved for the nodal coordinates. In one embodiment, matrix algorithms are used iteratively in a least squares error technique. The solution provides a relative configuration of the array to a desired level of accuracy. If an absolute configuration of the array is required (for example, with respect to a particular reference coordinate system), the relative configuration is combined with depth and heading sensor measurements of the nodes of the array.

To measure nodal depth, commercial depth sensors may be used at points or nodes of the array. Alternatively, the depth of certain nodes may also be measured using the system of the present invention, thus eliminating some of the processing needed to determine the shape of the array. If some or all of the nodes that include transducers are being towed relatively close to the surface of the water and the surface is reasonably smooth, then a reasonably precise measurement of the depth may be achieved. Thus, the transducer of a node emits a chirp that is reflected off of the water's surface and received by a hydrophone associated with the emitting node. The signal is detected using the above-described correlation processing, and a TOF and range is determined. (It is noted that the reflection off the surface of the water inverts the waveform; thus a negative correlation peak is detected in the processing.) One half of the range (which accounts for the round trip path to the surface and back) is the measured depth of the node. In this manner, the depth of those nodes having transducers and hydrophones that are reasonably close to the surface of the water may be determined.

In the embodiment described above, it was noted that all nodes of the array having transducers chirped in sequence. It is noted that, in general, chirping by all transducers in the array and processing of all chirps received by every hydrophone in the array provides a certain amount of redundancy in the determination of range between nodes of the array. In theory, each node of the array does not have to chirp and every hydrophone does not have to process every received chirp in order to obtain all of the distances between nodes of the array. For example, in a simplified array comprising two nodes on two lines, if the range between node 1 and node 2 is determined based on a chirp emitted from node 1, then the same range theoretically does not need to be determined using a subsequent chirp from node 2. (Consequently, node 2 may only comprise a hydrophone.) The preferred embodiment relies on chirping by all of the nodes that include transducers and processing of the chirps received by hydrophones at all of the nodes as described above, in order to provide redundancy. However, the invention includes chirping by less than all of the nodes including transducers and/or processing of less than all chirps received by hydrophones in the array, provided enough data is generated to measure the shape of the array. In any case, it is clear that a minimum number of nodes in a suitable distribution must have emitting transducers to generate the range data needed to determine the shape of all of the nodes of the array.

In addition, in the embodiment described above, the HFM waveform of the emitted chirp is the same for all emitting transducers, and timing was used by the backbone to differentiate waveforms emitted from the various nodes. In an alternative embodiment, two or more HFM waveforms may be created in the manner described above. Thus, different waveforms may be emitted by different nodes of the array. The different waveforms may be distributed among nodes of the array such that each node is programmed to emit a single waveform selected from among the multiple waveforms. Alternatively, each node may have multiple waveforms programmed (namely, the different chirp waveforms) for the D/A converter and the backbone may select which one the transducer emits as a function of time. The waveforms are designed to be sufficiently distinct so that each waveform does not cross correlate with the others. This allows multiple nodes to chirp simultaneously, where a different chirp waveform is output by each chirping node. The different waveforms may be discriminated in a hydrophone if received simultaneously by applying the cross-correlation operations for each waveform to the received signal. By using simultaneous emissions from some of the nodes, the shape of the array may be determined more frequently.

It is also noted that, while full waveform correlations of the waveform are used in the preferred embodiment above, lesser correlations (including one-bit correlation) are included in the invention. This may be necessary in faster mediums, where comprehensive processing cannot be performed in real-time.

Although illustrative embodiments of the present invention have been described herein with reference to the accompanying drawings, it is to be understood that the invention is not limited to those precise embodiments, but rather it is intended that the scope of the invention is as defined by the scope of the appended claims.

What is claimed is:

1. An acoustic array comprising a plurality of nodes attached to two or more lines, at least a subset of the nodes including an emitting transducer and a receiving hydrophone, and the balance of the nodes comprising a hydrophone, each emitting transducer having associated electronics comprising a high fidelity amplifier and a stored waveform input to drive the amplifier, the output of the amplifier exciting the transducer to emit a chirp having a hyperbolic frequency modulated (HFM) waveform, the stored waveform having predetermined amplitude and frequency characteristics that cause the chirp emitted from the transducer to have a lowest frequency at least one decade below a resonant frequency of the transducer and a highest frequency of less than 25 KHz and at least one octave below the resonant frequency of the transducer.

2. The acoustic array as in claim 1, wherein the transducer provides a signal having at least a 6 dB signal to noise ratio at the lowest frequency of the HFM chirp between the nodes of the array having the largest separation.

3. The acoustic array as in claim 1, wherein the chirp output by the transducer of a particular node is received as part of an acoustic signal by at least one of the hydrophones of the other nodes, the at least one of the hydrophones including first means for detecting the chirp.

4. The acoustic array as in claim 3, wherein the first means comprises means for performing a cross-correlation operation using the received acoustic signal.

5. The acoustic array as in claim 4, wherein the means for performing the cross-correlation operation also uses a cross-correlation reference waveform based on the HFM waveform of the emitted chirp.

6. The acoustic array as in claim 3, further comprising a second means, in signal communication with each of the nodes of the array, configured to determine a TOF between the node of the emitting transducer and the node of at least one receiving hydrophone based on detection of the chirp by the at least one receiving hydrophone.

7. The acoustic array as in claim 6, wherein the second means uses the TOF to determine the range between the node of the emitting transducer and the node of the at least one receiving hydrophone.

8. The acoustic array as in claim 7, wherein the second means uses the range between the node of the emitting transducer and the node of the at least one receiving hydrophone to determine the shape of the array.

9. The acoustic array as in claim 1, wherein the nodes of the array are connected to a processing and electronics backbone.

10. The acoustic array as in claim 9, wherein the processing and electronics backbone sends timing signals to at least some of the transducers so that they are each excited to emit a chirp in sequence.

11. The acoustic array as in claim 10, wherein the processing and electronics backbone causes the nodes of the array to operate such that for each chirp emitted by a particular node in the array, the hydrophones of the other nodes on other lines in the array listen for an acoustic signal containing the chirp.

12. The acoustic array as in claim 11, wherein the backbone processes the acoustic signals received by each of the hydrophones of the other nodes to detect the chirp.

13. The acoustic array as in claim 12, wherein the backbone uses a cross-correlation operation of the acoustic signal received and a cross correlation reference waveform of the chirp to detect the chirp in the signal received by each of the hydrophones of the other nodes.

14. The acoustic array as in claim 12, wherein detected chirps for each of the receiving hydrophones of the other nodes are used by the processing backbone to determine the range between the emitting node and the node of the respective receiving hydrophone.

15. The acoustic array as in claim 14, wherein the backbone uses the ranges between nodes to determine the shape of the array.

16. The acoustic array as in claim 1, wherein the high fidelity amplifier is a closed-loop feedback amplifier.

17. The acoustic array as in claim 16, wherein the closed-loop feedback amplifier is an operational amplifier.

18. The array as in claim 1, wherein a ratio of the highest frequency to the lowest frequency is not less than two.

19. The array as in claim 1, wherein the predetermined amplitude and frequency characteristics of the stored waveform cause an amplitude envelope of the HFM chirp to sloped so as to increase the amplitude of higher frequencies relative to lower frequencies of the HFM chirp.

20. The acoustic array as in claim 1, wherein the chirp output by the transducer of a particular node is received as part of an acoustic signal by at least one of the hydrophones of the other nodes, the at least one of the hydrophones including:
an analog-to-digital converter (A/D) for sampling the received acoustic signal at rate equal to at least a Nyquist frequency corresponding to the highest frequency of the HFM chirp, to produce sampled-time series data representative of the received acoustic signal;
means for zero-padding the sampled-time series data;
means for converting the zero-padded sampled-time series data to a frequency domain signal; and
means for performing a correlation between the frequency domain signal and a frequency domain signal corresponding to the stored waveform.

21. An acoustic transducer useable as a node of an acoustic array, comprising associated electronics including an amplifier and a stored waveform input to drive the amplifier, the output of the amplifier exciting the transducer to emit a chirp having a hyperbolic frequency modulated (HFM) waveform, the stored waveform having predetermined amplitude and frequency characteristics that cause the chirp emitted from the transducer to have a lowest frequency at least one decade below a resonant frequency of the transducer and a highest frequency of less than 25 KHz and at least one octave below the resonant frequency of the transducer.

* * * * *